United States Patent
March et al.

(10) Patent No.: US 8,397,276 B2
(45) Date of Patent: *Mar. 12, 2013

(54) PROTECTING A NETWORK FROM UNAUTHORIZED ACCESS

(75) Inventors: Sean W. March, Plano, TX (US); Patrick N. Sollee, Richardson, TX (US); David W. McKnight, Garland, TX (US)

(73) Assignee: Genband US LLC, Frisco, TX (US)

( * ) Notice: Subject to any disclaimer, the term of this patent is extended or adjusted under 35 U.S.C. 154(b) by 313 days.

This patent is subject to a terminal disclaimer.

(21) Appl. No.: 12/729,567

(22) Filed: Mar. 23, 2010

(65) Prior Publication Data

US 2010/0175110 A1 Jul. 8, 2010

Related U.S. Application Data

(63) Continuation of application No. 09/881,604, filed on Jun. 14, 2001, now Pat. No. 7,684,317.

(51) Int. Cl.
*G06F 15/16* (2006.01)

(52) U.S. Cl. .................. 726/3; 726/4; 726/21; 726/26

(58) Field of Classification Search .................. None
See application file for complete search history.

(56) References Cited

U.S. PATENT DOCUMENTS

| | | | |
|---|---|---|---|
| 5,727,146 A | 3/1998 | Savoldi | |
| 5,826,014 A | 10/1998 | Coley et al. | |
| 6,128,298 A | 10/2000 | Wootton | |
| 6,219,706 B1 | 4/2001 | Fan | |
| 6,233,245 B1 | 5/2001 | Chapman | |
| 6,307,845 B1 | 10/2001 | Hummelgren | |
| 6,331,984 B1 | 12/2001 | Luciani | |
| 6,396,833 B1 | 5/2002 | Zhang | |
| 6,427,174 B1 | 7/2002 | Sitaraman | |
| 6,636,898 B1 | 10/2003 | Ludovici et al. | |
| 6,650,641 B1 | 11/2003 | Albert et al. | |
| 6,654,882 B1 | 11/2003 | Froutan et al. | |
| 6,697,377 B1 | 2/2004 | Ju | |
| 6,725,378 B1 * | 4/2004 | Schuba et al. | 726/13 |
| 6,731,642 B1 | 5/2004 | Borella et al. | |
| 6,744,767 B1 | 6/2004 | Chiu | |

(Continued)

FOREIGN PATENT DOCUMENTS

| | | |
|---|---|---|
| WO | WO 97/40610 | 10/1997 |
| WO | WO 99/59071 | 11/1999 |

(Continued)

OTHER PUBLICATIONS

Information Science Institute, Internet Protocol, DARPA Internet Program Protocol Specification, RFC 791, pp. 1-44 (Sep. 1981).

(Continued)

*Primary Examiner* — Jeffrey Pwu
*Assistant Examiner* — Van Nguyen
(74) *Attorney, Agent, or Firm* — Haynes and Boone, LLP

(57) ABSTRACT

A system to dynamically protect access to a first network receives a data unit containing a source address indicating a source of the data unit. The source address is matched with information stored in the system, and entry of the data unit to the first network is enabled or denied based on the matching. It is determined whether the data unit contains an identifier of a codec type that matches a stored codec type, and occurrence of an attack of the first network is indicated in response to determining that the identifier is of a codec type that does not match the stored codec type.

10 Claims, 8 Drawing Sheets

U.S. PATENT DOCUMENTS

| | | | |
|---|---|---|---|
| 6,771,674 | B1 | 8/2004 | Schuster |
| 6,928,082 | B2 | 8/2005 | Liu |
| 6,944,673 | B2 | 9/2005 | Malan |
| 7,058,974 | B1 * | 6/2006 | Maher et al. .................... 726/13 |
| 7,406,713 | B2 | 7/2008 | Sheymov et al. |
| 7,684,317 | B2 | 3/2010 | March et al. |
| 7,774,849 | B2 | 8/2010 | Russell et al. |
| 7,940,654 | B2 | 5/2011 | March et al. |
| 2002/0114319 | A1 | 8/2002 | Liu et al. |
| 2003/0043740 | A1 | 3/2003 | March |
| 2004/0100976 | A1 | 5/2004 | Chang |
| 2005/0135359 | A1 | 6/2005 | Chang |
| 2005/0254482 | A1 | 11/2005 | Yeom |
| 2006/0288411 | A1 | 12/2006 | Garg |
| 2007/0094412 | A1 | 4/2007 | Sollee |
| 2007/0192508 | A1 | 8/2007 | Sollee |
| 2008/0075097 | A1 | 3/2008 | Kitada |
| 2008/0168181 | A1 | 7/2008 | Berkvens |
| 2008/0256624 | A1 | 10/2008 | Sheymov et al. |

FOREIGN PATENT DOCUMENTS

| | | |
|---|---|---|
| WO | WO 00/60826 | 10/2000 |
| WO | WO 00/78008 | 12/2000 |
| WO | WO 02/03217 | 1/2002 |
| WO | WO 02/11400 | 2/2002 |

OTHER PUBLICATIONS

J. Postel, User Datagram Protocol, RFC 768, pp. 1-3 (Aug. 1980).
S. Deering, Network Working Group Request for Comments: 2460, Internet Protocol, Version 6 (IPv6) Specification, pp. 1-33 (Dec. 1998).
H. Shulzrinne, Network Working Group Request for Comments: 1889, RTP: A Transport Protocol for Real-Time Applications, pp. 1-63 (Jan. 1996).
M. Handley, Network Working Group Request for Comments: 2543, SIP: Session Initiation Protocol, pp. 1-128 (Mar. 1999).
M. Arango, Network Working Group Request for Comments: 2705, Media Gateway Control Rpotocol (MGCP), pp. 1-113 (Oct. 1999).
F. Thernelius et al., SIP Firewall Solution, Internet Draft, Jul. 2000, pp. 1-16.
H.Schulzrinne, "The Session Initiation Protocol: Internet-Centrick Signaling," IEEE Communications Magazine, IEEE Service Center, Piscataway, vol. 38, No. 10, Oct. 2000, pp. 134-141.
J. Rosenberg, et al., "SIP Traversal Through Residential and Enterprise NATs and Firewalls, Internet Draft," Online, Mar. 2, 2001, pp. 1-22.
U.S. Patent Office, U.S. Appl. No. 11/592,775, Non-Final Rejection dated Dec. 16, 2008, pp. 1-9 and attachments.
U.S. Patent Office, U.S. Appl. No. 11/592,775, Final Rejection dated Jul. 9, 2009, pp. 1-10 and attachments.
U.S. Patent Office, U.S. Appl. No. 11/592,775, Non-Final Rejection dated Mar. 4, 2010, pp. 1-11 and attachments.
Notice of Allowance and Fee(s) Due for U.S. Appl. No. 11/592,775 (Sep. 28, 2010).
Notice of Allowance and Fee(s) Due for U.S. Appl. No. 09/881,604 (Nov. 4, 2009).
Non-Final Official Action for U.S. Appl. No. 09/881,604 (Feb. 18, 2009).
Notice of Panel Decision from Pre-Appeal Brief Review for U.S. Appl. No. 09/881,604 (Dec. 15, 2008).
Final Official Action for U.S. Appl. No. 09/881,604 (Oct. 29, 2007).
Non-Final Official Action for U.S. Appl. No. 09/881,604 (May 17, 2007).
Non-Final Official Action for U.S. Appl. No. 09/881,604 (Nov. 1, 2006).
Final Official Action for U.S. Appl. No. 09/881,604 (Jul. 14, 2006).
Non-Final Official Action for U.S. Appl. No. 09/881,604 (Jan. 12, 2006).
Non-Final Official Action for U.S. Appl. No. 09/881,604 (Jun. 28, 2005).
Non-Final Official Action for U.S. Appl. No. 09/881,604 (Dec. 2, 2004).
"Packet-based multimedia communications systems," Series H: Audiovisual and Multimedia Systems, H.323, pp. 1-258 (Nov. 2000).
"SDP: Session Description Protocol," RFC 2327 (Apr. 1998).
Notice of Allowance and Fee(s) Due for U.S. Appl. No. 11/592,775 (Jan. 4, 2011).
Communication pursuant to Article 96(2) EPC for European Application No. 02765147.0 (Oct. 12, 2007).
Notificaton of European Publication Number and Information on the Application of Article 67(3) EPC for European Application No. 02765147.0 (May 12, 2004).
Notification of Transmittal of the International Preliminary Examination Report for International Application No. PCT/IB02/03156 (Jun. 17, 2003).
Written Opinion for International Application No. PCT/IB02/03156 (Apr. 24, 2003).
Notification of Transmittal of the International Search Report or the Declaration for International Application No. PCT/IB02/03156 (Feb. 10, 2003).

* cited by examiner

PROTECTING A NETWORK FROM UNAUTHORIZED ACCESS

CROSS-REFERENCE TO RELATED APPLICATION

This is a continuation of U.S. Ser. No. 09/881,604, filed Jun. 14, 2001 now U.S. Pat. No. 7,684,317, which is hereby incorporated by reference.

TECHNICAL FIELD

The invention relates generally to protecting networks from unauthorized access.

BACKGROUND

Various forms of communications can be performed in packet-based networks, such as electronic mail, web browsing, file transfer, and so forth. With the increased capacity and reliability of packet-based networks, voice communications (along with other forms of real-time, interactive communications) have also become feasible. In such communications, voice and other real-time data are carried in packets that are sent across the network.

Various standards have been proposed for voice and multimedia communications over packet-based networks. One such standard is the H.323 Recommendation from the International Telecommunication Union (ITU). Another standard for voice and multimedia communications is the Session Initiation Protocol (SIP), as developed by the Internet Engineering Task Force (IETF). Generally, H.323, SIP, and other control protocols are used for negotiating session information to coordinate the establishment of a call session. Once negotiation setup has been completed, packetized media (including voice or other forms of real-time data) can flow between endpoints. A media transport protocol, such as the Real-Time Protocol (RTP), is used for conveying packetized media between the endpoints.

Because communications, such as call sessions, often traverse a public network such as the Internet, security is a concern. However, security must be balanced against the needs of users for convenient access of various types of services, such as electronic mail, web browsing, and telephony communications. A need thus continues to exist for improved methods and apparatus for enabling robust secure communications over various networks.

SUMMARY

In general, in accordance with an embodiment, a system for use in communications between a first network and an external network comprises a storage module to store a pattern or threshold for a communications session. A controller is adapted to deny further entry of data units from the external network to the first network in the communications session in response to the controller detecting that a rate of incoming data units exceeds the threshold or the incoming data units do not match the pattern.

In general, in accordance with another embodiment, a method of dynamically protecting access to a first network includes receiving, in a system, a data unit containing an address indicating a source of a data unit, and matching the source address with information dynamically stored in the system. Entry of the data unit to the first network is enabled if the source address matches the information stored in the system. Entry of the data unit to the first network is denied if the source address does not match the information stored in the system.

Some embodiments of the invention may have one or more of the following advantages. Security of a private network is enhanced. Also, a feature is provided by some embodiments to prevent malicious attacks. By filtering on certain information in incoming data units, the likelihood of unauthorized entry of the private network is reduced.

Other features and advantages will become apparent from the following description, from the drawings, and from the claims.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible.

Figure 1:
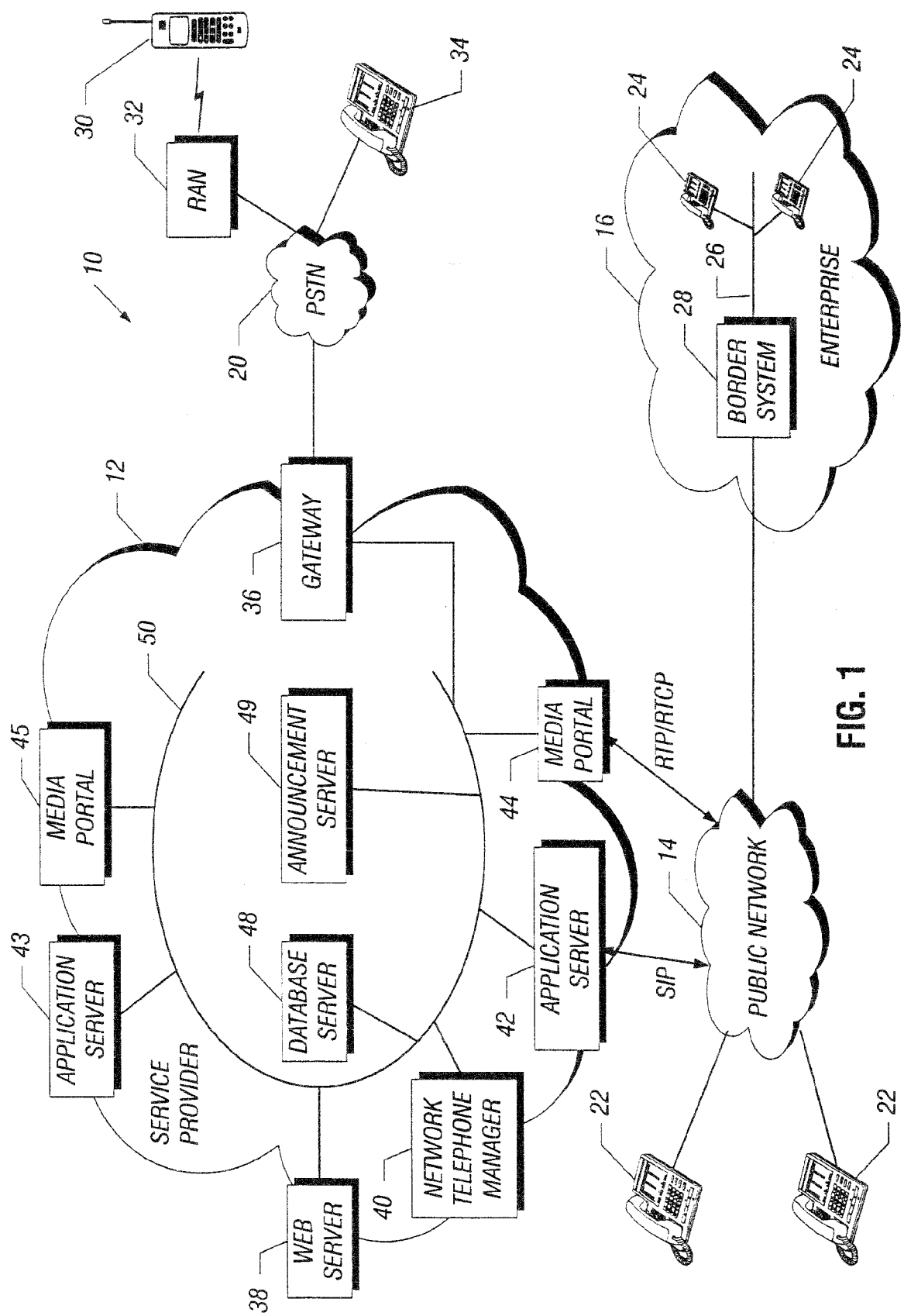
FIG. 1 is a block diagram of an example communications system that incorporates an embodiment of the invention.

Referring to FIG. 1, a communications system 10 includes a public network (e.g., the Internet) 14, an enterprise 16 (e.g., a company, a government agency, a university, or other organization of multiple users), a service provider 12, and a public switched telephone network (PSTN) 20. The arrangement of FIG. 1 is shown for purposes of illustration and example, since other embodiments can have other arrangements.

The service provider 12 includes a private network 50 coupled to various internal nodes, and the enterprise 16 includes a private network 26 coupled to various internal nodes and terminals. The service provider 12 enables access by subscribers of various resources in the communications system 10, including the public network 14 and the PSTN 20. Thus, a user station coupled to the public network 14, such as one of user stations 22 or one of user stations 24 in the enterprise 16, can perform various forms of communications through the service provider 12. Examples of possible communications include electronic mail, web browsing, and real-time, interactive communications (e.g., voice, video conferencing, and so forth).

The user stations 24, which are connected to the enterprise private network 26, communicate with the public network 14 through a border system 28. In one example, the border system 28 includes a firewall and network address and port translation capabilities.

The user stations 22 and 24 can be network telephones (which are telephones including a network interface to enable communication with a packet-based network), computers fitted with voice processing capabilities (referred to as "softphones"), or other terminals capable of participating in real-time, interactive communications sessions. One example of a network telephone is the i2004 telephone from Nortel Networks. Examples of other user stations that can be endpoints of communications sessions include mobile stations 30 coupled by wireless links to a radio access network (RAN) 32, which is in turn connected to the PSTN 20. Also, a wired telephony device 34 can be coupled to the PSTN 20.

The service provider 12 includes various components that are visible on the public network 14, including a web server 38, a network telephone manager 40, application servers 42 and 43, and media portals 44 and 45. The service provider 12 includes internal nodes that are not visible to the public network 14, including a gateway 36 to the PSTN 20, a database server 48, an announcement server 49, and other nodes (not shown). The gateway 36 translates between call control signaling and media according to a first format (e.g., packet-based format) used on the public network 14 and another format (e.g., circuit-switched format) used on the PSTN 20. The database server 48 stores information of registered devices, including information relating to which domain the devices are in, subscriber information, subscribed services, and other information. The announcement server 49 can be used to play an announcement for certain incoming calls.

The web server 38 presents web pages that can be browsed by users on the public network 14. The network telephone manager 40 is used for managing network telephones. The network telephone manager 40 generates and receives call control signaling on behalf of the network telephones. Once a call is established, media is communicated directly with a respective network telephone. In other embodiments, the network telephones may be capable of exchanging and processing call control signaling without the assistance of the network telephone manager 40.

The application server 42 or 43 communicates call control signaling with stations or nodes on the public network 14 or on the private network 50 for establishing a call. Once the call is established, media or bearer traffic is communicated through the media portal 44 or 45 between endpoints. In one embodiment, the media packets can contain Real-Time Protocol (RTP) data that are carried within a User Datagram Protocol (UDP)/Internet Protocol (IP) packet.

In one example, call control signaling for establishing a call session is according to a Session Initiation Protocol (SIP). SIP is part of the multimedia data and control architecture from the IETF, and one version of SIP is described in Request for Comments (RFC) 2543, entitled "SIP: Session Initiation Protocol," dated 1999. SIP can be used to initiate call sessions as well as to invite members to a session that may have been advertised by some other mechanism, such as electronic mail, web pages, and so forth. RTP, which defines a protocol for transporting real-time data, is described in RFC 1889 entitled "RTP: A Transport Protocol for Real-Time Applications," dated January 1996. UDP defines a transport layer that is described in RFC 768, entitled "User Datagram Protocol," dated August 1980. One version of IP is described in RFC 791, entitled "Internet Protocol," dated September 1981, while another version of IP is described in RFC 2460, entitled "Internet Protocol, Version 6 (IPv6) Specification," dated December 1998. Other standards can also be employed to provide call control signaling, such as the H.323 Recommendation from the International Telecommunication Union (ITU).

As used here, a "call session" refers generally to a real-time, interactive communications session that involves the exchange of real-time data between multiple parties. An interactive communications session refers to a session in which two or more parties are involved in an exchange of data. A real-time, interactive communication session refers to an exchange of data, such as audio and/or video data, on a substantially real-time basis between two endpoints. A session is substantially real-time if interaction is occurring between two endpoints with communication from one endpoint followed relatively quickly by a response or another communication from the other endpoint. A "call request" is a message for establishing a call session. A "media packet" or "media data unit" refers to a packet or data unit carrying bearer traffic (e.g., voice, video, etc.) in a call session.

In accordance with some embodiments of the invention, the media portal 44 or 45 acts as a packet filter to prevent unauthorized packets from entering the service provider private network 50. In one example, when an IP packet is received by the media portal 44 or 45 from the public network 14, the media portal 44 or 45 analyzes the payload of the IP packet. The media portal 44 or 45 allows only IP packets containing RTP/RTCP payloads to traverse the media portal 44 or 45 onto the service provider private network 50. IP packets not containing RTP/RTCP packets are discarded and/or logged and reported by the media portal 44 or 45.

The media portal 44 or 45 is also able to filter on the address and port of an incoming packet from the public network 14. For each call session that is established through the media portal 44 or 45, information is dynamically generated on a per-call basis that contains address and/or port information of authorized originators of call sessions from the public network 14. For example, the information includes a network address and port translation (NAPT) table having one or more entries corresponding to one or more call sessions. The NAPT table (which is discussed in greater detail below) is used to map a source address and port in an incoming packet to a translated address and port. The destination endpoint sees the translated address and port, not the original source address and port. The media portal 44 checks the source address and port identified in incoming packets and matches that against a mapping table entry. Packets that do not have a matching entry in the mapping table are rejected and logged or reported by the media portal 44 or 45.

Another feature provided by the media portal 44 or 45 according to some embodiments is the ability to detect malicious attacks from an external network such as the public network 14 through the use of an algorithm that utilizes media session information to detect attack patterns. For example, media session information can be used to dynamically establish expected traffic thresholds on a per-call session basis. If the media portal 44 or 45 detects that a greater than expected amount of packets from the external network have been received for the call session, the media portal 44 or 45 can report the attack and/or shut down the call session to circumvent the attack.

By using network address and port translation, the media portal 44 or 45 is also able to hide or shield identities of endpoints from each other during a call session. From the perspective of each endpoint, the media portal 44 or 45 is the node that the endpoint is communicating with. In effect, the media portal 44 or 45 masquerades as each of the endpoints in a call session between the endpoints. Thus, a call between endpoints 1 and 2 no longer flows from 1 to 2, but rather flows between 1 and 2' (which is the network presence of endpoint 2 on the media portal 44 or 45) and between 1' (which is network presence of endpoint 1 on the media portal 44 or 45) and 2. In a call session between endpoints 1 and 2, endpoint 1 sends media packets to 2' (thinking that it is 2), and endpoint 2 sends media packets to 1' (thinking that it is 1).

To enable this feature, the media portal 44 or 45 includes a network address and port translation (NAPT) module that translates both the source and destination addresses (e.g., IP addresses) and ports (e.g., UDP ports) of each received packet. Although reference is made to an NAPT module that translates both network addresses and ports, other embodiments may involve translation modules that translate only the network address or only the port. Calls handled through the service provider 12 can involve endpoints that are both located outside the private network 50, such as user stations 22 and/or user stations 24. Alternatively, a call can involve an endpoint outside the service provider private network 50 and a node on the service provider private network 50, such as the gateway 36 or the announcement server 49.

Figure 2:
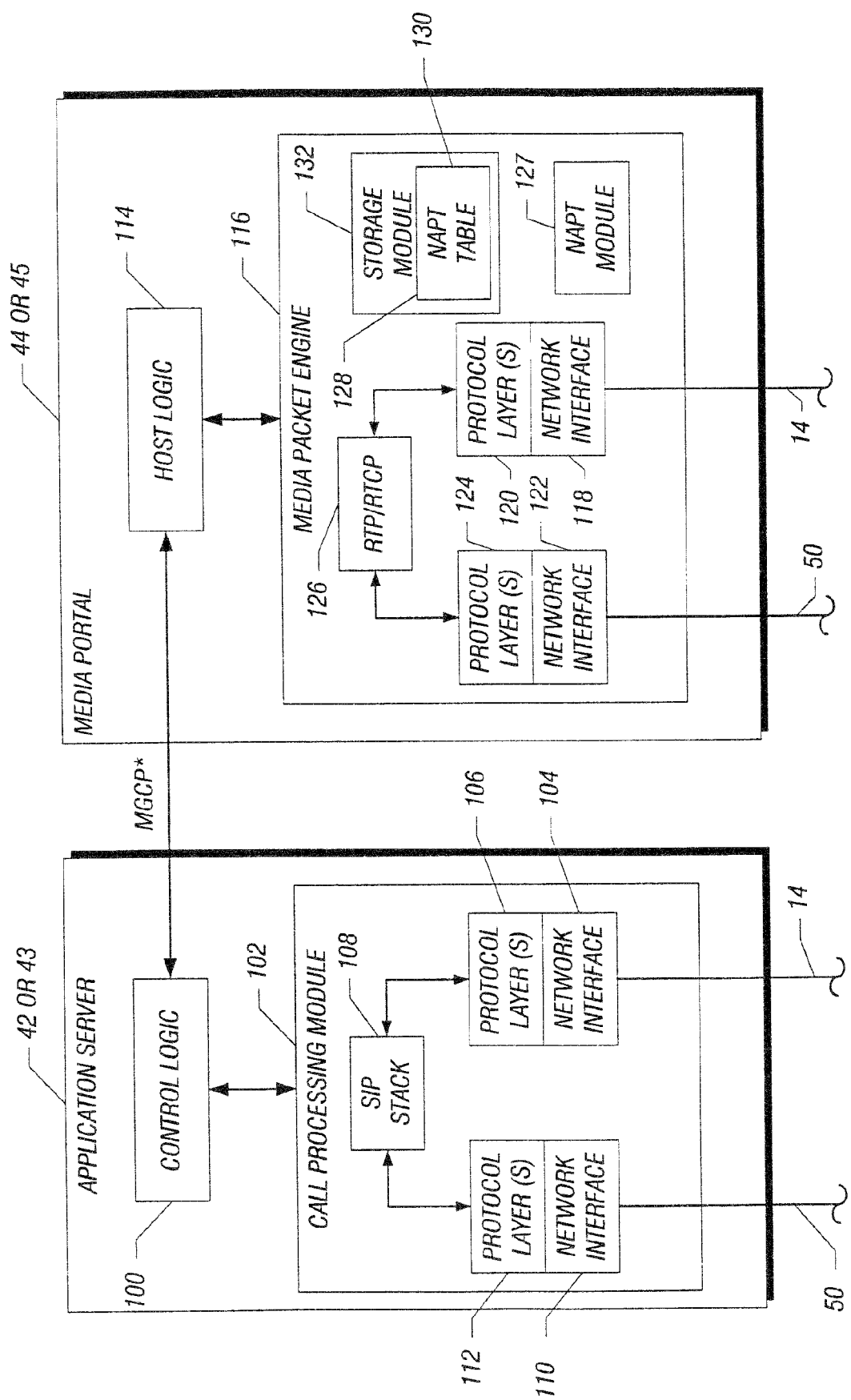
FIG. 2 is a block diagram of components of an application server and a media portal, in accordance with an embodiment.

Referring to FIG. 2, components of the application server 42 or 43 and the media portal 44 or 45 are illustrated. The application server 42 or 43 includes control logic 100 and a call processing module 102. The call processing module 102 receives call control signaling from the public network 14 and the private network 50. The call processing module 102 includes a network interface 104 to the public network 14, one or more protocol layers 106 above the network interface 104, and a SIP stack 108 for processing SIP messages. In one embodiment, the protocol layers 106 include a UDP transport layer and an IP network layer.

The call processing module 102 also includes a second network interface 110 coupled to the private network 50, and one or more protocol layers 112 above the network interface 110.

The control logic 100 of the application server 42 or 43 communicates with host logic 114 in the media portal 44. The control logic 100 and host logic 114, which can be implemented in software or a combination of software and hardware, employ a predefined messaging scheme to exchange messages with each other. In one example, the messaging scheme is according to an enhanced version of the Media Gateway Control Protocol (MGCP), as described in RFC 2705, entitled "Media Gateway Control Protocol (MGCP), Version 1.0," dated October 1999. Enhancements to the MGCP messages are added to support transport of certain types of data between the media portal 44 or 45 and the application server 42 or 43. The enhancements include the introduction of a new format for a parameter (EndpointId) used to identify endpoints and a parameter (referred to as X+NAPTAddressType) to specify the type of network mapping. Such enhancements are explained below.

The media portal 44 or 45 also includes a media packet engine 116. In one embodiment, the media packet engine 116 can be implemented on multiple circuit boards or blades (each with two interfaces to the public and private networks 14 and 50) to facilitate concurrent communication of messages between networks. The media packet engine 116 includes a first network interface 118 coupled to the public network 14, and one or more protocol layers 120 above the network interface 118. Similarly, a second network interface 122 is coupled to the private network 50, and one or more protocol layers 124 are provided above the network interface 122. An RTP/RTCP module 126 is also part of the media packet engine 116. RTP, which provides a mechanism for transporting real-time data across a packet-based network, is an application sublayer that typically runs on top of the UDP layer (which is part of the protocol layers 120 or 124). Specified along RTP is the Real-Time Control Protocol (RTCP), which provides a mechanism for sharing various session data between endpoints. In accordance with one embodiment, voice and other forms of real-time data are carried in RTP packets communicated across the public network 14 and the private network 50.

Also included in the media packet engine 116 is an NAPT module 127 and an NAPT table 128 that contains plural entries 130. Each entry of the NAPT table 128 contains mapping information for source and destination addresses and ports of media packets received from the networks 14 and 50. For a given call session involving a first device and a second device, each NAPT table entry includes a first address and port of the first device, a second address and port of the second device, a first alias address and port mapped to the first device address and port, and a second alias address and port mapped to the second device address and port. The contents of each NAPT table entry are discussed further below. The NAPT table entry is dynamically updated as a call session is being established and throughout the life of the call session. Once the call session is terminated, the allocated resources in the NAPT table entry are deleted and made available to other call sessions.

The NAPT table 128 is stored in a storage module 132. The NAPT module 127 uses information in the NAPT table 128 to perform network address and port translations.

Figure 3:
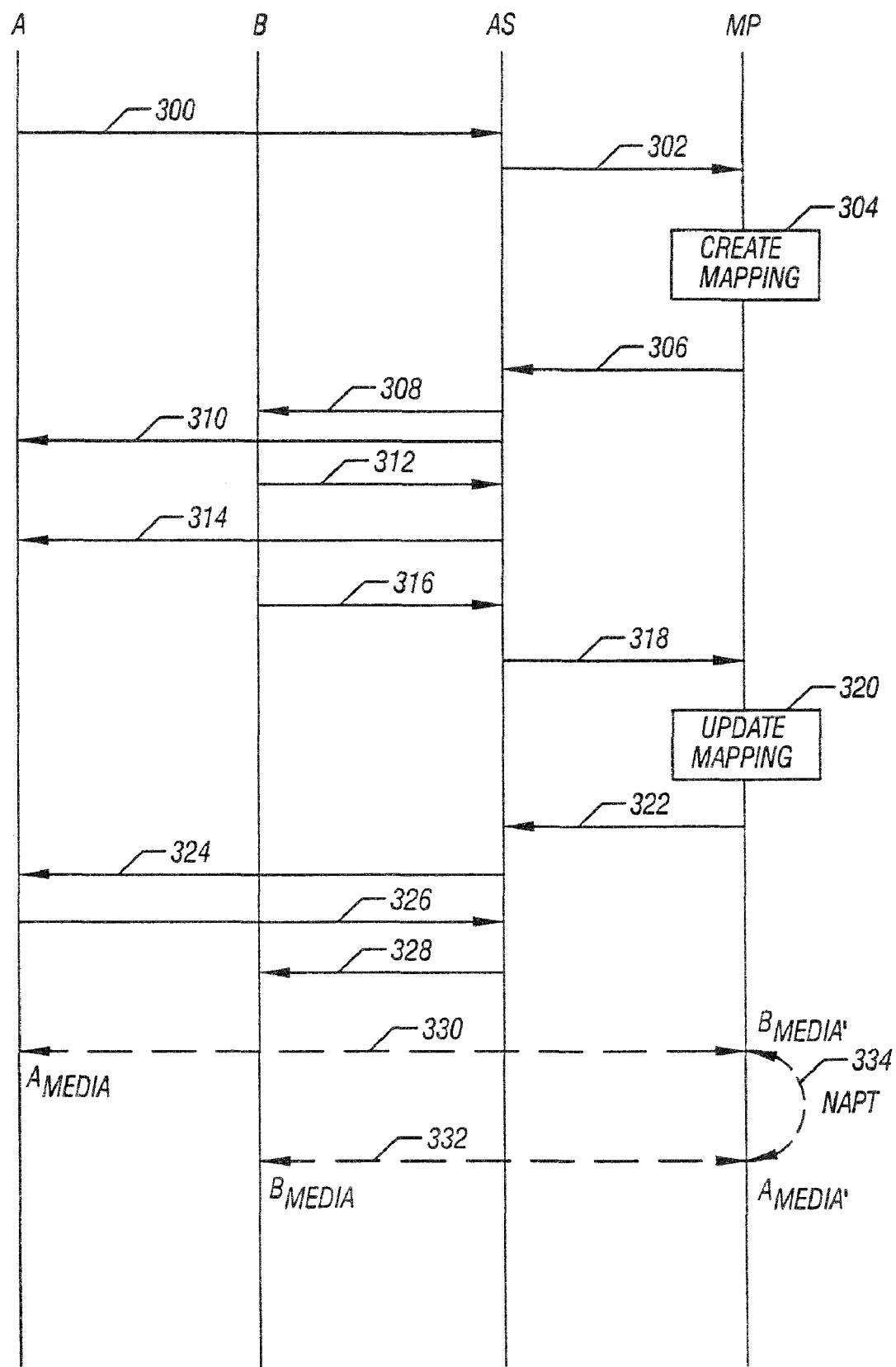
FIG. 3 is a message flow diagram of a call flow between a first user station and a second user station that are part of the same domain.

Before proceeding to a discussion of the security and filtering features of some embodiments of the invention, a call flow to set up a call session is illustrated. In an example call flow shown in FIG. 3, a call session is established between user station A and user station B. In the call flow, it is assumed that both users stations are in the same domain and serviced by the same application server (42) and media portal (44). User station A is the initiator of the call. User station A sends (at 300) a call request. If SIP messaging is used, the call request is a SIP INVITE message. The SIP INVITE message is sent to the application server 42. The INVITE message contains the following content (not all elements of the message have been shown):

INVITE
From: A@xxx.com
To: B@xxx.com
SDP: RTP/RTCP 47.1.1.1:1000

In the INVITE message, the From: address represents user station A, and the To: address represents user station B. A Session Description Protocol (SDP) portion contains the network address and port that the destination node or station is to send media packets to once the call is established. SDP is described in RFC 2327, entitled "SDP: Session Description Protocol," dated April 1998. In the example, the network address is 47.1.1.1, and the port number is 1000. The combination of the network address and port is represented as 47.1.1.1:1000. The flag RTP/RTCP indicates that the specified network address and port is the network address and port for receiving media packets. More generally, the originating network address and port for user station A is referred to as $A_{media}$, the address and port of user station A for communicating media packets.

Once the application server 42 receives the INVITE message, it performs a location query on the To: address and determines that user station B is in the same domain (xxx-.com) as user station A. B is then identified as a valid address. The location query can be performed using data in the database server 48. Next, the application server 42 sends a request (at 302) to the media portal 44 to allocate NAPT resources for performing a network address and port translation of media packets in the requested call session. In one embodiment, the request includes an MGCP CreateConnection.

In response to the request, the media portal 44 allocates (at 304) the necessary resources (addresses and ports) to support NAPT for the call session. In one embodiment, the MGCP CreateConnection message format is as follows:

CRCX 1234 A:1000@47.1.1.1 MGCP 0.1
C: 987651
M: recvonly
MGCPVerb=CRCX (CreateConnection)
TransactionId=1234
EndpointId=A:1000@47.1.1.1
MGCPVersion=0.1
CallId=987651
ConnectionMode=recvonly (receive only)

One pertinent field of the CreateConnection message is the parameter EndpointId, which is equated to A:1000@47.1.1.1, where A represents audio. For video or other media, other indicators are used. The EndpointId parameter, which is a parameter whose format has been altered from the standard MGCP-defined EndpointId as an enhancement, identifies the address and port that the media portal 44 is to allocate resources for. The example provided above (and elsewhere in this description) is a relatively simple implementation of EndpointId. Other fuller implementations include providing a larger part of the media description that is in the SDP portion of the INVITE or other SIP message). Also, a CallId parameter is supplied in the MGCP CreateConnection message. The CallId parameter is used as a key to point to an entry in the NAPT mapping table 128.

The media portal 44 reserves two external IP addresses and ports $A_{media}'$ and $B_{media}'$ (e.g., 201.3.3.3:1010 and 201.3.3.3:2020 for audio), one ($A_{media}'$) that is mapped to the originating endpoint address and port $A_{media}$, and one ($B_{media}'$) that is mapped to the terminating endpoint address and port $B_{media}$ (which is unknown to the media portal at this point). A mapping table entry containing the allocated addresses is shown below:

| CallId | OrigEndpoint ($A_{media}$) | OrigNAPTAddr ($A_{media}'$) | TermNAPTAddr ($B_{media}'$) | TermEndpoint ($B_{media}$) |
|---|---|---|---|---|
| 987651 | A:1000@47.1.1.1 | A:2020@201.3.3.3 | A:1010@201.3.3.3 | ??? |

In the above example, OrigEndpoint refers to the originating endpoint address and port $A_{media}$; OrigNAPTAddr refers to the originating NAPT address and port $A_{media}'$ (at the public interface of the media portal) that the terminating endpoint (user station B) is communicating with; TermNAPTAddr refers to the terminating NAPT address and port $B_{media}'$ (also at the public interface of the media portal) that user station A communicates with; and TermEndpoint refers to the terminating endpoint address and port $B_{media}$.

The media portal 44 then returns (at 306) the originating NAPT network address and port ($A_{media}'$, which in the above example is 201.3.3.3:2020) to the application server 42 in a response message (e.g., an MGCP response message). The NAPT network address and port $A_{media}'$ is used to represent user station A to user station B (the called terminal). Similarly, the terminating NAPT network address and port ($B_{media}'$, which in the above example is 201.3.3.3:1010) is used to represent user station B to originating user station A.

The application server 42 then substitutes the network address and port $A_{media}$ (specified in the SDP portion of the original INVITE message) with the originating NAPT network address and port $A_{media}'$. An INVITE message containing $A_{media}'$ is then sent (at 308) to user station B. The content of this INVITE message is shown below:

INVITE
From: A@xxx.com
To: B@xxx.com
SDP: RTP/RTCP 201.3.3.3:2020

The application server 42 responds (at 310) to user station A with a SIP 100 TRYING message. Note that the SIP TRYING message is likely communicated from the application server 42 to user station A as soon as the INVITE message (sent at 300) was received by the application server 42. For example, TRYING may have been communicated by the application server 42 before communication of the CreateConnection request at 302.

In response to the INVITE message sent at 308, user station B responds (at 312) with a SIP 180 RINGING message. At this point, user station B knows to send media packets for the call session to network address and port $A_{media}'$. The SIP 180 RINGING message is propagated (at 314) by the application server 42 back to user station A.

If user station B desires to answer the call request (such as when a user takes the target terminal off the hook, an answering machine answers, and so forth), user station B sends a SIP 200 OK message (at 316) to the application server 42. Some of the content of the SIP 200 OK message is as follows:

SIP 200 OK
From: B@xxx.com
To: A@xxx.com
. . .
SDP: RTP/RTCP 54.5.5.5:2000

The SIP 200 OK message contains an SDP portion that specifies the address and port $B_{media}$ of the terminating endpoint. In the example above, the terminating network address and port $B_{media}$ is 54.5.5.5:2000.

In response to the SIP 200 OK message, the application server 42 sends a request (at 318) to the media portal 44 to update the reserved resources (addresses and/or ports) in the media portal 44 for the specified call session. In one example, the request can be in the form of an MGCP ModifyConnection request that has the following content:

MDCX 1236 A:2000@54.5.5.5 MGCP 0.1
C:987651
M: sendrecv
MGCPVerb=MDCX (ModifyConnection)
TransactionId=1236
EndpointId=A:2000@54.5.5.5
MGCPVersion=0.1
CallId=987651
ConnectionMode=sendrecv (send and receive)

The pertinent elements of the ModifyConnection request are the EndpointId parameter, which identifies the terminating network address and port for audio, and the CallId parameter, which is the key to an entry of the mapping table 128 that is associated with this call session.

In an alternative embodiment, an SDP portion may also be included in a SIP RINGING message (or some other message), in which case the acts performed at 318 can be performed in response to that message.

Upon receiving the ModifyConnection message, the media portal 44 uses the CallId parameter as a key to find the associated mapping resources in the NAPT mapping table 128. The terminating endpoint field (TermEndpoint) in the table, which was previously unknown, is filled (at 320) with the terminating network address and port $B_{media}$. The mapped resources are now as follows:

| CallId | OrigEndpoint ($A_{media}$) | OrigNAPTAddr ($A_{media}'$) | TermNAPTAddr ($B_{media}'$) | TermEndpoint ($B_{media}$) |
|---|---|---|---|---|
| 987651 | A:1000@47.1.1.1 | A:2020@201.3.3.3 | A:1010@201.3.3.3 | A:2000@54.5.5.5 |

The media portal 44 next returns (at 322) the terminating NAPT network address and port $B_{media}'$ to the application server 42. The application server 42 then substitutes $B_{media}$ with $B_{media}'$ in the SDP portion of the SIP 200 OK message. The modified SIP 200 OK message is then sent (at 324) from the application server 42 to user station A. User station A responds to the SIP 200 OK message with a SIP ACK message (at 326). User station A now knows to send media packets to $B_{media}'$ if user station A wishes to communicate with user station B. The application server 42 propagates the SIP ACK message (at 328) to user station B.

At this point, a media or call session has been established between user stations A and B through the media portal 44. User station A communicates with network address and port $B_{media}'$ (in the public interface of the media portal 44) at 330, and user station B communicates with network address and port $A_{media}'$ (in the public interface of the media portal 44) at 332. Media packets are routed between B' and A' in the media portal 44 by performing translations at 334 using the mapping table entry shown above.

The media portal 44 is now able to perform NAPT functions using the NAPT table entries shown above during the established call session between user stations A and B. Note that neither user station A nor user station B are aware of the network address and port of the other endpoint. Thus, the user stations A and B send media packets not directly to each other, but to the media portal 44. Media packets that are sent from user station A arrive at network address and port $B_{media}'$ of the media portal, which are forwarded to user station B via $A_{media}'$. Media packets sent from user station B arrive at network address and port $A_{media}'$, which are forwarded to user station A via $B_{media}'$.

Figure 4:
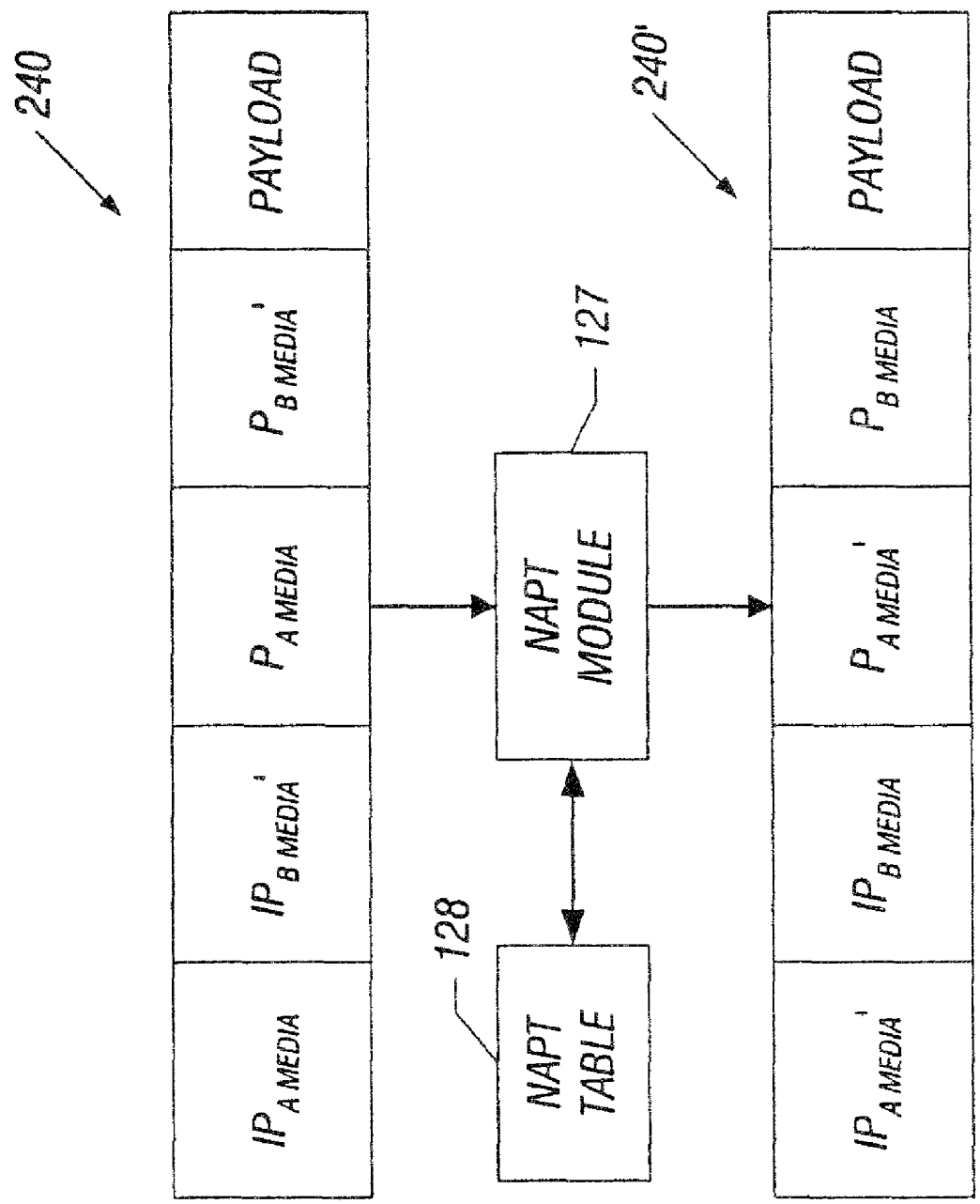
FIG. 4 illustrates mapping of addresses and ports of a media packet communicated in a call session set up by the flow of FIG. 3.

Thus, as shown in FIG. 4, a media packet 240 is originated by user station A. In the media packet, the source IP address is $IP_{Amedia}$, the destination IP address is $IP_{Bmedia}'$, the source UDP port is $P_{Amedia}$, and the destination UDP port is $P_{Bmedia}'$. After conversion of both the source and destination addresses and ports by the mapping module 127 in the media portal 44, the modified media packet 240' contains a source IP address $IP_{Amedia}'$, destination IP address $IP_{Bmedia}$, a source UDP port $P_{Amedia}'$, and a destination UDP port $P_{Bmedia}$. A similar translation process is performed in the reverse direction.

Figure 5:
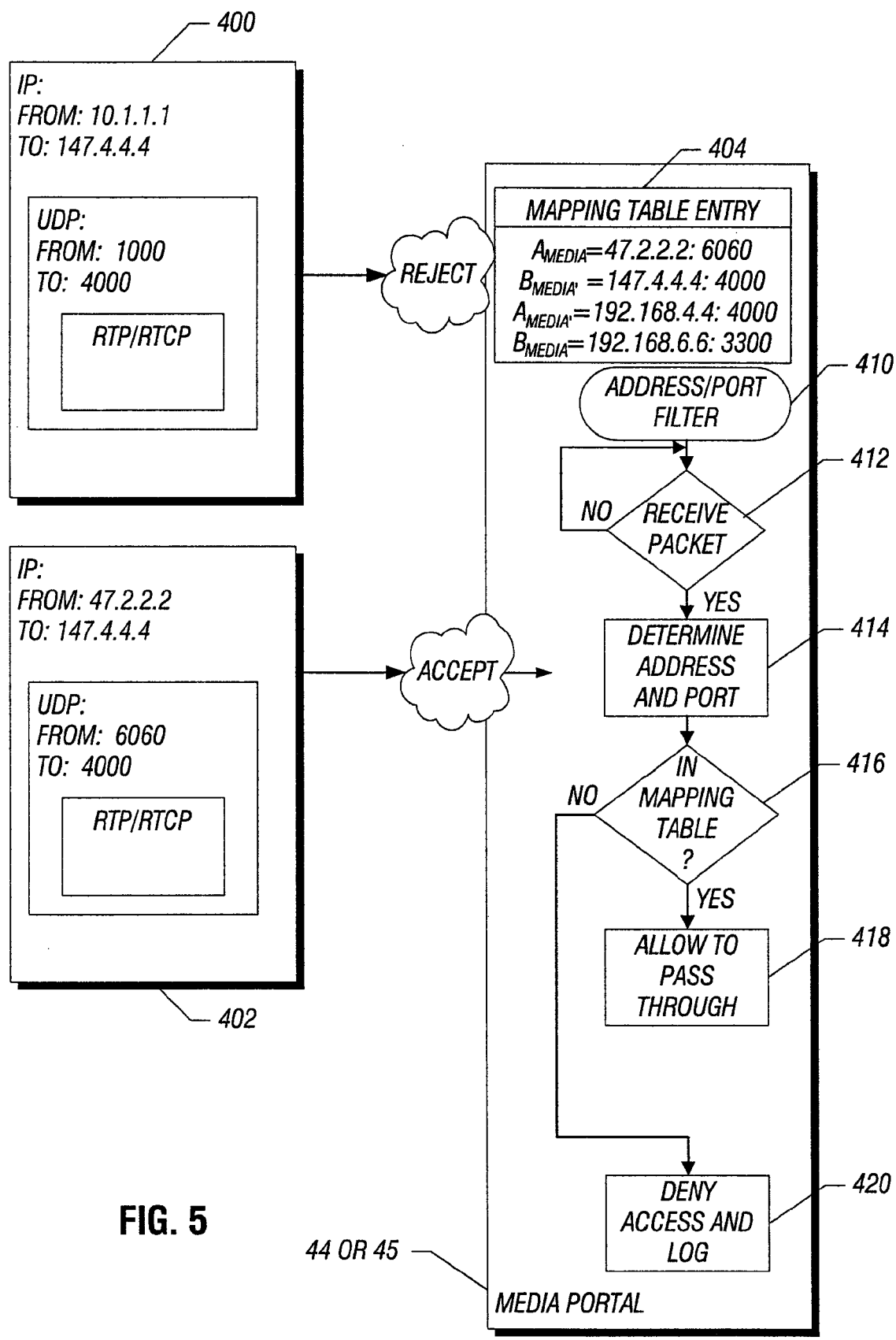
FIG. 5 illustrates filtering of incoming packets from an external network to determine that the packets contain a source address and port that match information contained in a media portal.

Referring to FIG. 5, the media portal 44 or 45 includes an address/port filter module 410 that looks at the IP address and port of an incoming packet from the public network 14 and determines if a matching entry exists in the NAPT mapping table 128 (FIG. 2). In the example of FIG. 5, two IP packets 400 and 402 are received by the media portal 44 or 45. In the example, the IP source and destination addresses in the packet 400 are 10.1.1.1 and 147.4.4.4, respectively. The UDP source and destination ports are 1000 and 4000, respectively. In the packet 402, the source and destination IP addresses are 47.2.2.2 and 147.4.4.4, respectively. The UDP source and destination ports are 6060 and 4000, respectively.

When a call session is established between endpoints through the media portal 44 or 45, a mapping table entry 404 is created, as shown in FIG. 5. In the example, a mapping table entry 404 contains the following fields: $A_{media}$=47.2.2.2: 6060; $B_{media}'$=147.4.4.4:4000; $A_{media}'$=192.168.4.4:4000; and $B_{media}$=192.168.6.6:3300.

The address and port filter 410 uses the information in the mapping table entry 404 to determine whether to accept or reject the incoming packets 400 and 402. First, the address/port filter module 410 determines if a packet has been received (at 412). If so, the address/port filter 410 determines (at 414) the source address and port of the packet. In the example, the source address and port of packet 400 is 10.1.1.1:1000, and the source address and port of packet 402 is 47.2.2.2:6060.

The address/port filter module 410 then matches (at 416) the source address and port with an entry in the mapping table. Assuming that mapping table entry 404 is the only entry in the table, the source address and port of packet 400 is not matched with the address and port $A_{media}$ of the mapping table entry 404. However, the source address and port of the packet 402 can be matched to the address and port $A_{media}$ of the mapping table entry 404.

If the source address and port can be matched, the address/port filter module 410 allows the packet to pass through (at 418). However, if a match cannot be found, the address/port filter module 410 denies access and creates a log entry (at 420). Thus, in the example, packet 400 is rejected, while packet 402 is allowed to continue through the media portal 44 or 45.

Figure 6:
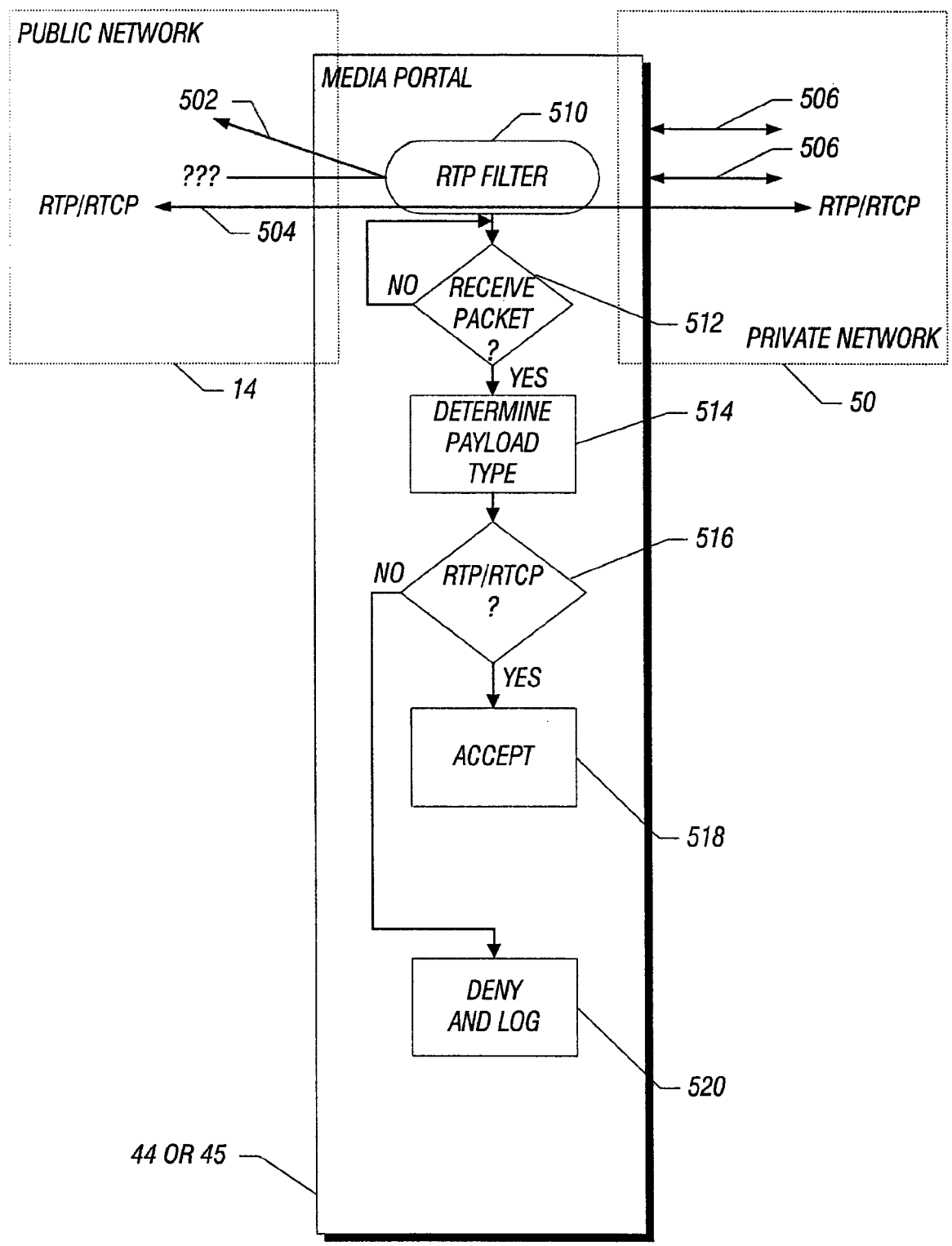
FIG. 6 illustrates filtering of incoming packets from an external network to determine that the packets contain a predetermined type of payload (e.g., Real-Time Protocol or Real-Time Control Protocol payload).

Referring to FIG. 6, an RTP filter module 510 (which is in addition to other modules in the media portal 44 or 45) controls the acceptance and denial of incoming packets from the public network 14 based on the type of packet. The RTP filter module 510 can be implemented in hardware, software, or a combination thereof. As illustrated, a media packet containing RTP/RCTP payload is allowed to pass through the media portal 44 or 45 by the RTP filter module 510, indicated by the path 504. Packets containing other types of payload (indicated by a lack of RTP/RTCP signature fields in the RTP/RTCP header) are rejected by the RTP filter 510, as represented by path 502. Internally within the private network 50, various communication paths 506 that involve the media portal 44 or 45 are allowed.

The RTP filter 510 determines (at 512) if a packet from the public network 14 has been received. If so, the RTP filter module 510 determines (at 514) the payload type. Determination of whether an IP packet contains an RTP or RTCP payload is performed by looking for an RTP or RTCP header in the payload section of the IP packet. The search looks for certain signature fields in the RTP/RTCP header, which are fields having predetermined values at particular offsets. RTP provides a mechanism for transporting real-time data, such a voice and video. RTP provides time-stamping, delivery monitoring, and sequence numbering services. Specified alongside RTP is RTCP, which provides a mechanism for sharing various session data (e.g., performance statistics) between endpoints. RTCP also provides a mechanism for monitoring session quality (e.g., packet counts, packet loss, etc.) for an RTP session.

If the packet contains an RTP/RTCP payload, then the packet is accepted (at 518) by the RTP filter module 510. Processing of the packet then continues (including network address and port translation) by the media portal 44 or 45. However, if the IP packet does not contain an RTP/RTCP payload, then the packet is denied (at 520) and a log entry is made in the media portal 44 or 45.

Figure 7:
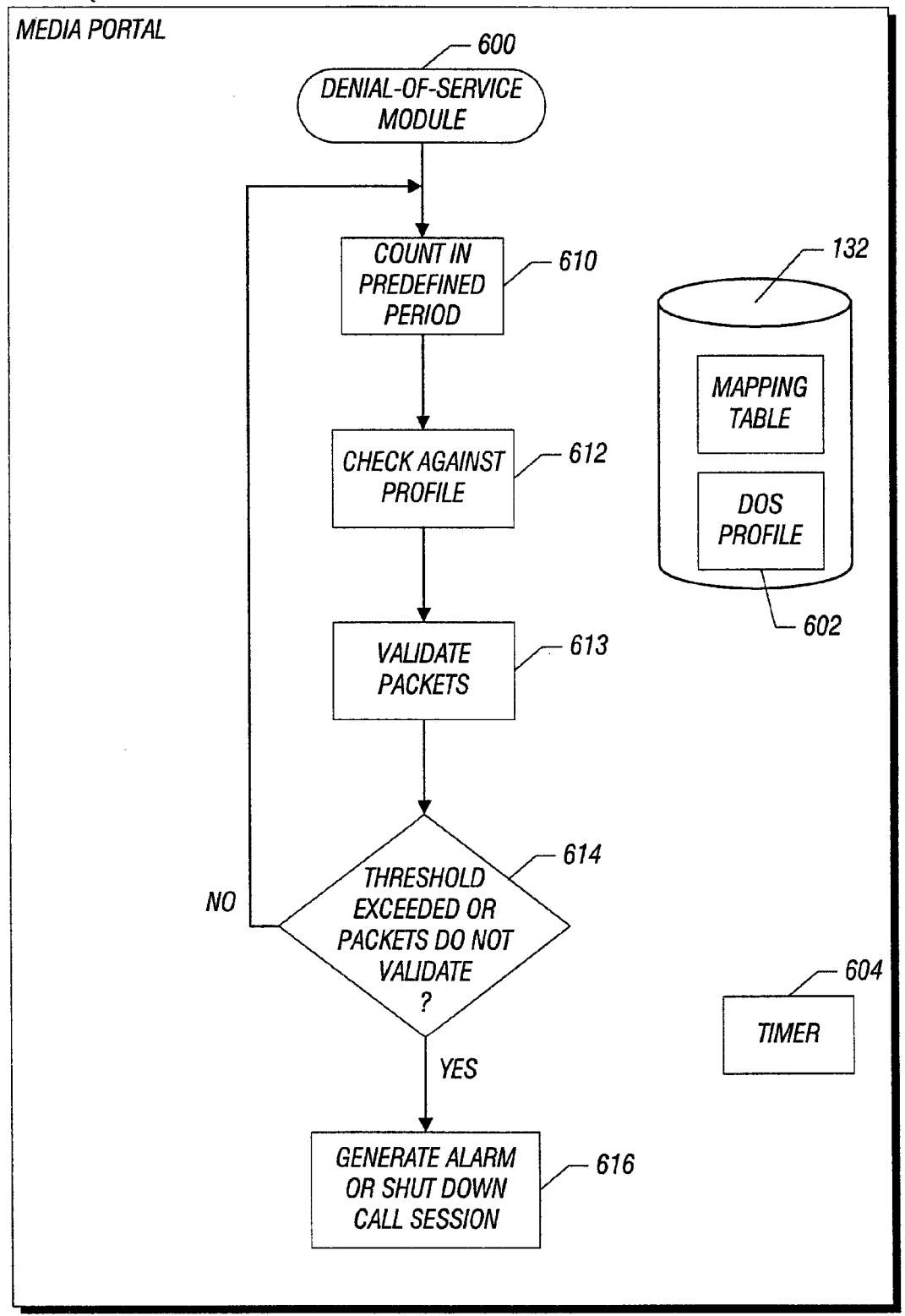
FIG. 7 illustrates protection against a malicious attack based on profile information for a call session.

Referring to FIG. 7, the media portal 44 or 45 also includes a denial-of-service (DOS) module 600, which detects for malicious attacks from an external network (e.g., the public network 14) through the use of an algorithm that is based on media session information to establish expected traffic patterns/thresholds on a per-session basis. The media session information and expected traffic thresholds are kept in a DOS profile 602 in the storage 132 of the media portal 44 or 45. Each call session is associated with a DOS profile 602.

The DOS profile 602 for RTP media packets contains codec type and frame size information for the respective call session. For voice call sessions, an audio codec in each terminal encodes audio signals originating from an audio input device (e.g., microphone) for transmission and decodes received audio data for output to an output device (e.g., a speaker). The codec can be implemented in software or hardware. Several types of codecs are available that have varying levels of data compression and data transfer rate requirements. For example, the G.711 codec provides uncompressed communications of voice data, but has a data transfer rate requirement of 64 kbps (kilobits per second) in each direction. Other codecs, such as the G.728, G.729A, G.729, G.723.1, and G.722 have varying compression algorithms and data transfer rate requirements (which are lower than that of the G.711 codec). The listed G series of audio codecs are recommendations from the International Telecommunication Union (ITU). For communications involving video, video codecs can be used.

A frame size refers to the duration of a speech sample. For example, the frame size may be 10 milliseconds (ms), which indicates that a 10-ms sample of speech is contained in the frame. Examples of other frame sizes include 20 ms, 40 ms, and so forth. Each type of codec can support certain frame sizes. Thus, if the frame size used in a call session is 20 ms, then a terminal collects a 20-ms sample of speech and encapsulates them in a packet for transmission.

The DOS module 600 counts (at 610) the number of packets received from an external network (e.g., public network 14) in a call session during a predefined time period, which is defined by a timer 604 (which can be implemented in the media portal 44 or 45 as software, hardware, or a combination of both). The number of packets received in a predefined time period defines the rate of incoming packets. The DOS module 600 checks (at 612) the rate against a threshold in the DOS profile 602 for the call session.

For example, for RTP media, if the frame size is 20 ms, then it is expected that the incoming rate of packets should be about 50 packets per second (1 packet÷20 ms). If the incoming rate exceeds the 50 packets per second rate by some predefined percentage (the threshold rate) for some period of time (which can also be predefined), then an attack may be occurring.

Another check performed by the DOS module 600 is to determine (at 613) the codec type specified in each media packet. For example, the RTP header information contains an identifier of the type of codec used to encode the payload data. If the codec type specified in a predetermined number of packets does not match the negotiated codec type stored in the DOS profile, then an unauthorized attack may be occurring. The format of the RTP payload (including the codec type) is specified by a "PT" (payload type) field in the RTP header. More generally, checking for the codec type used in incoming packets is an example of protocol-specific pattern checking of each incoming packet.

If the DOS module 600 determines (at 614) that the threshold rate is exceeded, or that the validation performed at 613 failed, the DOS module 600 generates (at 616) an alarm. The alarm can be communicated to an administrator, for example. Alternatively, or additionally, the DOS module 600 can also shut down the external address and port of the media portal 44 or 45 allocated for the call session, so that further inflow of external packets in the affected call session is prevented.

Figure 8:
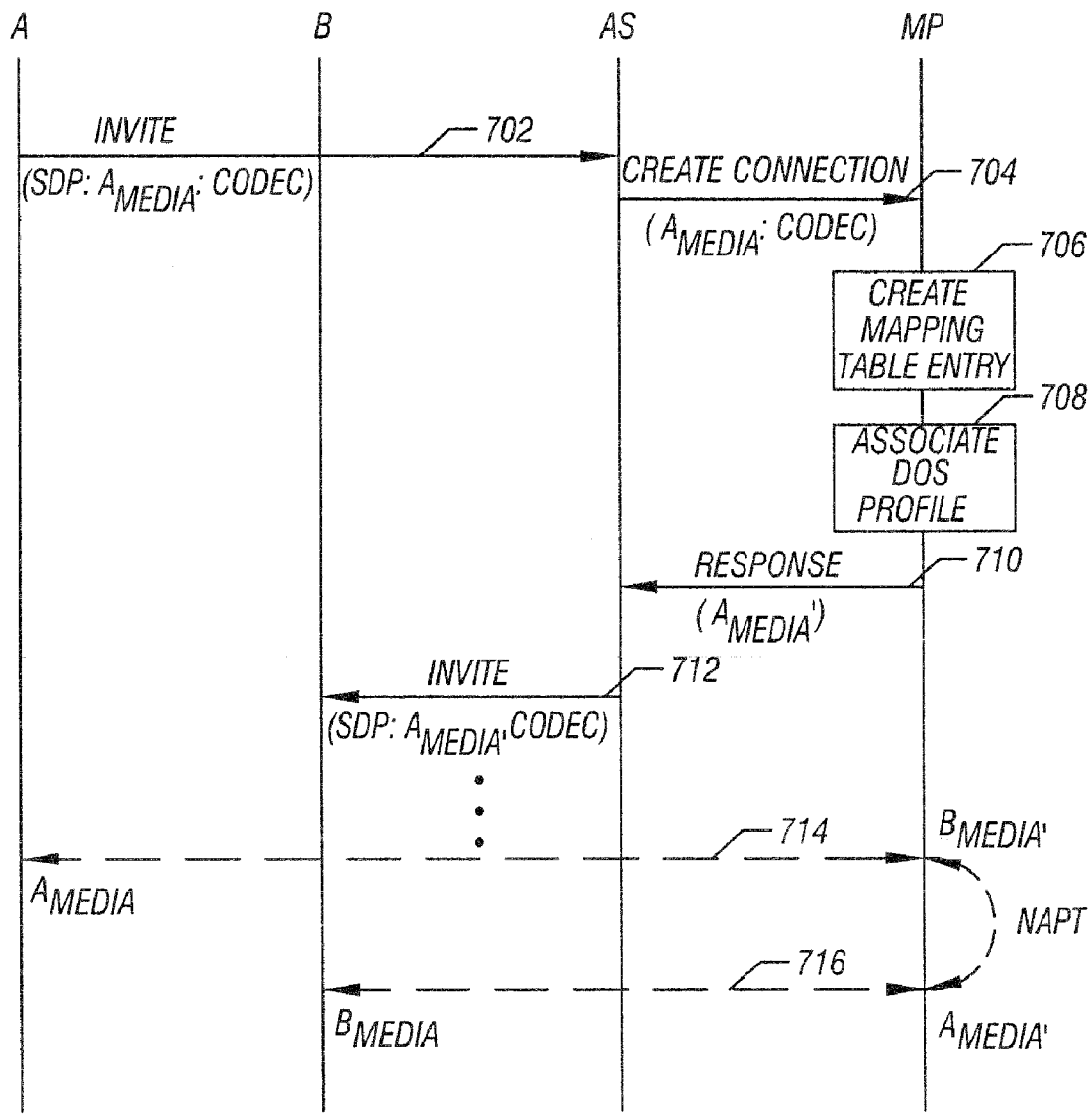
FIG. 8 is a message flow diagram of a process of establishing a call and setting up the profile information of FIG. 7.

The DOS profile 602 is associated during setup of the call session and can be modified at any point throughout the life of the call session. Creation of the initial association is illustrated in FIG. 8, which involves a call setup between user stations A and B through the application server 42. User station A sends (at 702) a SIP INVITE message to the application server 42. The SDP portion of the INVITE message contains the media address and port $A_{media}$ of user station A that is to be used for communication of media packets. In addition, the SDP portion of the INVITE message contains codec (coder/decoder) information, which indicates the type of codec and frame size to be used by user station A.

In response to the INVITE message, the application server 42 sends a CreateConnection request (at 704) to the media portal 44. The CreateConnection request contains the EndpointId $A_{media}$, along with other session information (e.g., codec type, frame size, etc.). In response to the CreateConnection request, the media portal 44 creates a mapping table entry (at 706), as described above. Also, the media portal 44 associates (at 708) a DOS profile to the call session being established, based on the supplied codec information. The DOS profile includes the codec type and frame size.

The media portal 44 sends (at 710) a response containing $A_{media}'$ back to the application server 42. The application server 42 then modifies the SDP portion of the INVITE message by substituting $A_{media}$ with $A_{media}'$. The modified INVITE message is then sent (at 712) to the user station B. After further protocol messaging, a call session is established between user stations A and B through the media portal 44, including a media connection 714 between $A_{media}$ and $B_{media}'$, and a media connection 716 between $B_{media}$ and $A_{media}'$.

The media portal 44 or 45 is thus able to perform three types of security checks: determining if the source address and port of an incoming packet matches information (e.g., NAPT table) in the media portal; determining if an incoming packet from an external network contains a particular payload (e.g., RTP/RTCP); and determining if a denial-of-service attack is occurring based on media session information (e.g., codec information). For purposes of the invention, not all three features have to be present in the media portal. For example, one or two of the three features may be implemented.

The various nodes and systems discussed each includes various software layers, routines, or modules. Such software layers, routines, or modules are executable on corresponding control units. Each control unit includes a microprocessor, a microcontroller, a processor card (including one or more microprocessors or microcontrollers), or other control or computing devices. As used here, a "controller" refers to a hardware component, software component, or a combination of the two.

The storage devices referred to in this discussion include one or more machine-readable storage media for storing data and instructions. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs). Instructions that make up the various software routines, modules, or layers in the various devices or systems are stored in respective storage devices. The instructions when executed by a respective control unit cause the corresponding node or system to perform programmed acts.

The instructions of the software routines, modules, or layers are loaded or transported to each node or system in one of many different ways. For example, code segments including instructions stored on floppy disks, CD or DVD media, a hard disk, or transported through a network interface card, modem, or other interface device are loaded into the device or system and executed as corresponding software routines, modules, or layers. In the loading or transport process, data signals that are embodied in carrier waves (transmitted over telephone lines, network lines, wireless links, cables, and the like) communicate the code segments, including instructions, to the device or system. Such carrier waves are in the form of electrical, optical, acoustical, electromagnetic, or other types of signals.

While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A system to dynamically protect access to a first network, comprising:
   a hardware network interface to receive a data unit containing a source address indicating a source of the data unit; and
   one or more hardware processors to:
      match the source address with information stored in the system;
      enable entry of the data unit to the first network for communication to a destination device on the first network if the source address matches the information stored in the system and deny entry of the data unit to the first network if the source address does not match the information stored in the system, wherein the destination device is separate from the system;
      determine whether the data unit contains an identifier of a codec type that matches a stored codec type; and
      indicate occurrence of an attack of the first network in response to determining that the identifier is of a codec type that does not match the stored codec type.

2. The system of claim 1, wherein the information includes a network address translation table, and the source address is matched with one or more entries of the network address translation mapping table.

3. The system of claim 1, wherein the source address is an Internet Protocol address.

4. A system to dynamically protect access to a first network, comprising:
   a hardware network interface to receive a data unit containing a source address indicating a source of the data unit;
   one or more hardware processors;
   an address filter executable on the one or more processors to:
      match the source address with information stored in the system;
      enable entry of the data unit to the first network if the source address matches the information stored in the system and deny entry of the data unit to the first network if the source address does not match the information stored in the system; and
   a protocol filter executable on the one or more processors to:
      determine if the data unit contains a payload according to a Real-Time Protocol or Real-Time Control Protocol; and
      deny entry of the data unit if the data unit does not contain the payload according to the Real-Time Protocol or Real-Time Control Protocol.

5. The system of claim 4, wherein the source address is an Internet Protocol address.

6. An article comprising at least one non-transitory machine-readable storage medium containing instructions for protecting a first network, the instructions when executed causing a system having one or more processors to:
   receive a data unit containing a source address indicating a source of the data unit;
   match the source address with information stored in the system;
   enable entry of the data unit to the first network for communication to a destination device on the first network if the source address matches the information stored in the system and deny entry of the data unit to the first network if the source address does not match the
   information stored in the system, wherein the destination device is separate from the system;
   determine whether the data unit contains an identifier of a codec type that matches a stored codec type; and
   indicate occurrence of an attack of the first network in response to determining that the identifier is of a codec type that does not match the stored codec type.

7. The article of claim 6, wherein matching the source address with the information includes matching the source address with one or more entries of a network address translation mapping table.

8. The article of claim 6, wherein matching the source address comprises matching an Internet Protocol address.

9. An article comprising at least one non-transitory machine-readable storage medium containing instructions for protecting a first network, the instructions when executed causing a system having one or more processors to:
   receive a data unit containing a source address indicating a source of the data unit;
   match the source address with information stored in the system;
   enable entry of the data unit to the first network if the source address matches the information stored in the system and deny entry of the data unit to the first network if the source address does not match the information stored in the system;
   determine if the data unit contains a payload according to a Real-Time Protocol or Real Time Control. Protocol; and
   deny entry of the data unit if the data unit does not contain the payload according to the Real-Time Protocol or Real-Time Control Protocol.

10. The article of claim 9, wherein the source address is an Internet Protocol address.

* * * * *